May 27, 1941. H. F. MALONE 2,243,807
SENDING UNIT FOR INDICATORS
Filed June 30, 1937 2 Sheets-Sheet 1
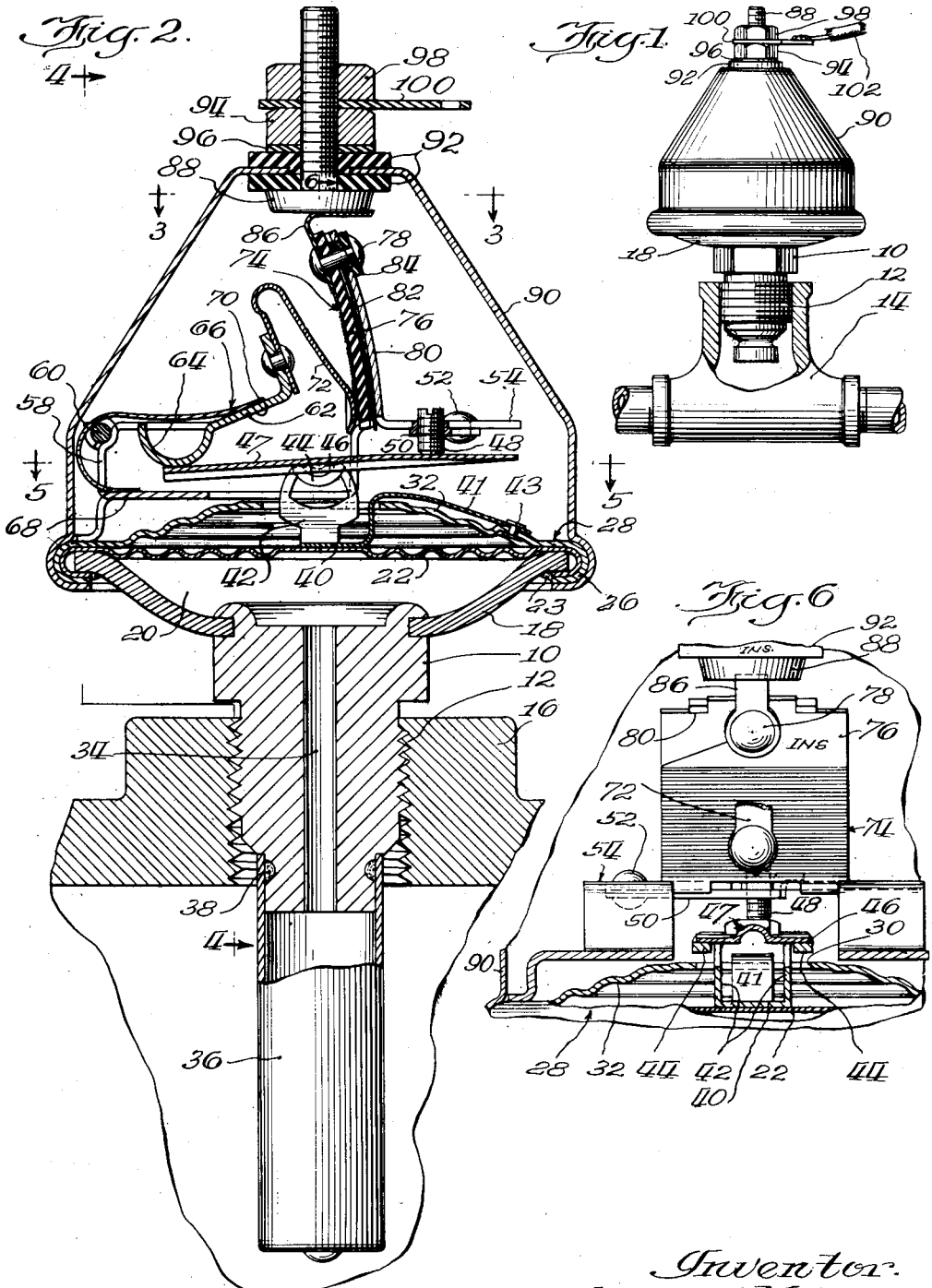
Inventor.
Homer F. Malone
By Williams, Bradbury, McCaleb & Hinkle
Attys May 27, 1941.　　H. F. MALONE　　2,243,807
SENDING UNIT FOR INDICATORS
Filed June 30, 1937　　2 Sheets-Sheet 2
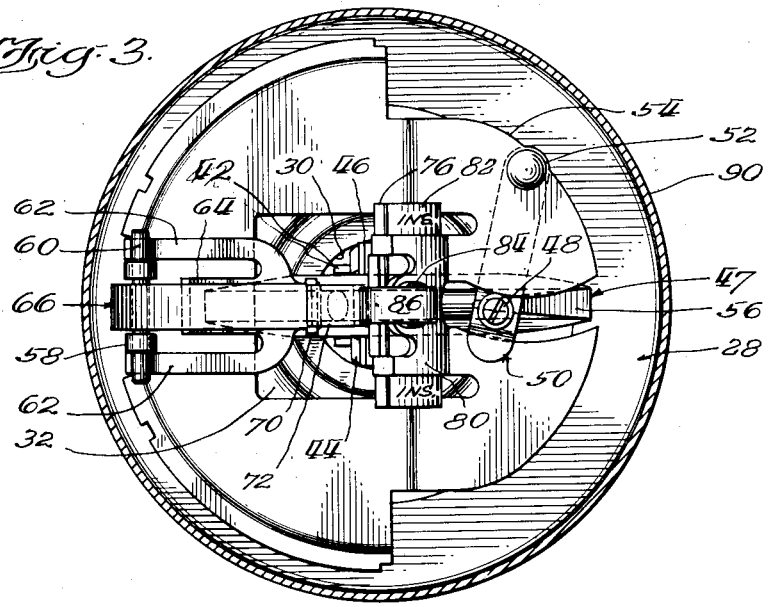
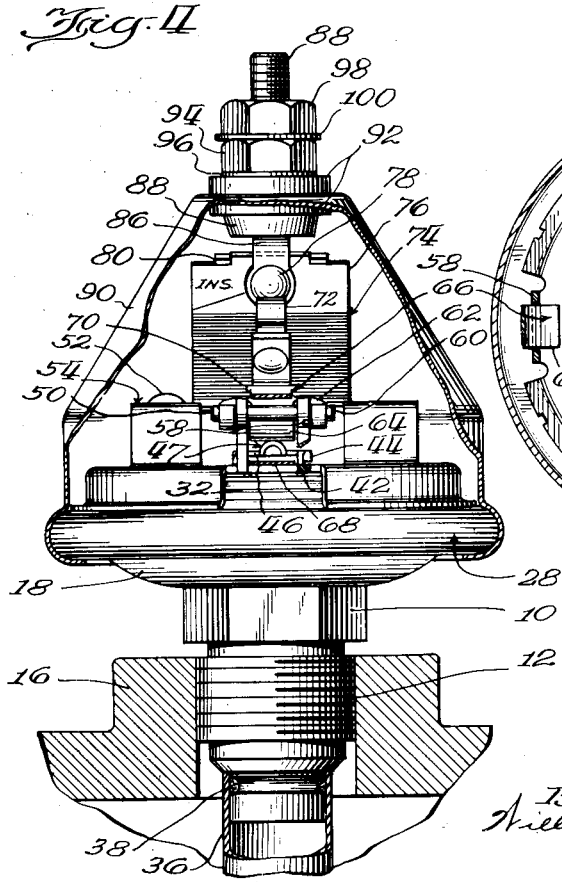
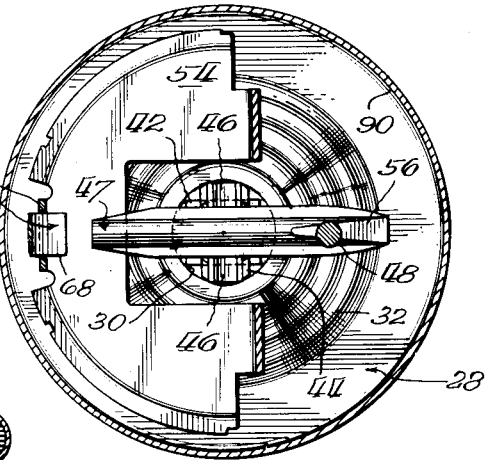
Inventor.
Homer F. Malone
By Williams, Bradbury, McCaleb & Hinkle
Attys.

Patented May 27, 1941

2,243,807

UNITED STATES PATENT OFFICE 2,243,807

SENDING UNIT FOR INDICATORS

Homer F. Malone, Chicago, Ill., assignor to Stewart-Warner Corporation, Chicago, Ill., a corporation of Virginia Application June 30, 1937, Serial No. 151,297

10 Claims. (Cl. 201—48)

My invention relates to sending units for indicators and is more particularly concerned with the provision of a sending unit responsive to pressure or temperature changes and adapted to control an electrical indicator such, for example, as that disclosed and claimed in my copending application, Serial No. 151,296, filed June 30, 1937.

An object of my invention is to provide a simple and accurate sending unit which may be easily calibrated and which will retain its calibration throughout its life.

Another object of my invention is to provide an improved sending unit which may be easily adapted to respond either to changes in temperature of an object whose temperature is to be indicated, or to changes in pressure of a fluid whose pressure it is desired to indicate.

Another object is to provide an inexpensive sending unit which will not be adversely affected by the vibration created by an automobile or other device upon which the sending unit may be mounted.

Other objects and advantages will become apparent as the description proceeds.

In the drawings,

Figure 1 is an elevation of an embodiment of my invention, showing it applied to the conduit of a fluid pressure system for the purpose of indicating the variations in the pressure of the fluid in the system.

Figure 2 is an enlarged axial section of the sending unit shown in Figure 1, but adapted for indicating temperature changes such as occur, for example, in the water jacket of an internal combustion engine.

Figure 3 is a transverse section taken on the line 3—3 of Figure 2.

Figure 4 is an irregular vertical section taken on the line 4—4 of Figure 2.

Figure 5 is a transverse section taken on the line 5—5 of Figure 2.

Figure 6 is a partial vertical section taken on the line 6—6 of Figure 2.

Referring to the drawings, I have illustrated my invention as comprising a base 10, which is threaded as indicated at 12 whereby my improved sending unit may be attached to a supporting part. In Figure 1 this supporting part is indicated as being the T 14 of a piping system containing fluid under pressure such, for example, as the pressure oiling system of an internal combustion engine. In Figure 2 the base 10 is illustrated as being threaded into the wall 16 of the water jacket of an internal combustion engine.

It will be understood that the showings of Figures 1 and 2 are merely illustrative of numerous uses to which my improved sending unit may be put and are not to be considered as limiting the scope of usefulness of my invention.

The base 10 has attached to the upper end thereof a dish shaped metal plate 18 forming one wall of a diaphragm chamber 20, which is closed by a diaphragm 22. This diaphragm may be made of corrugated metal, as shown in the drawings, or of any other suitable material, and has its edge rolled or otherwise formed over the periphery of the plate 18. Cover 28 overlies the diaphragm 22 and likewise has its rim 26 rolled or otherwise formed over the edge of the plate 18 and the intervening rim of the diaphragm 22. A soldered joint 23 between the edge of the diaphragm 22 and the plate 18 prevents leakage of fluid therebetween.

The cover 28 has a central opening 30 surrounded by a conical portion 32 in spaced relation to the upper surface of the diaphragm, whereby the central portion of the diaphragm is permitted to flex upwardly. The conical portion 32 of the cover 28 is corrugated as clearly indicated in Fig. 2 of the drawings, whereby the corrugated portion of the diaphragm 22 is uniformly supported by the cover 28 when the diaphragm is subjected to excessive pressure, such as occurs, for example, in the oiling system of an internal combustion engine when the oil is cold and congealed.

The base 10 has an axial bore 34 communicating with the diaphragm chamber 20. In Figure 2 the lower end of this bore is illustrated as being in communication with the interior of a metal cylinder 36 which is attached to the lower end of the base 10 as by means of a soldered joint 38. It is to be understood that the cylinder 36, bore 34, and diaphragm chamber 20 are filled with ether or other suitable material whose pressure changes materially with changes in the temperature of the water surrounding the cylinder 36. Such changes in the pressure of the ether exert an upward force on the diaphragm 22 proportional to the temperature of the water in the water jacket 16, whereby the central portion of the diaphragm 22 is flexed upwardly an amount proportional to the temperature of the water in the water jacket.

Where my improved sending unit is mounted as indicated in Figure 1, the lower end of the bore 34 is in direct communication with the interior of the T 14 so that the fluid in the piping system is in free communication with the diaphragm chamber 20 and exerts an upward force on the diaphragm 22 directly proportional to the pressure on the fluid in the piping system. It will be appreciated that numerous other variants of these two installations of my sending unit may be utilized.

A disc 40 lies in contact with the upper surface of the central portion of the diaphragm and is preferably attached to the cover 28 as by means of an integral spring finger 41 and rivet, or other attaching means, 43. This disc has integral arms 42 providing bearings 44 for pivotally supporting and guiding the journals 46 extending laterally from the lever 47 which pivots about the fulcrum 48 as the diaphragm 22 moves up or down.

The set screw 48 is mounted in a swing arm 50 pivotally attached at 52 to a supporting plate 54 suitably secured to the cover 28. It will be noted that the lever 47 is strengthened by having its central longitudinal portion displaced upwardly to form a ridge which is arcuate in cross section, and that the set screw 48 engages a tapered surface 56 (Figs. 2 and 5) which is inclined with respect to the rest of the lever 47. The swinging arm 50 and its pivotal mounting, are so designed that they offer sufficient resistance to movement to hold the fulcrum 48 in any adjusted position with respect to the surface 56, even when the sending unit is subjected to vibration, such as that created by an automotive vehicle in motion. It will be understood that when the diaphragm is undeflected the surface 56 of lever 47 is substantially parallel to supporting plate 54, so that swinging arm 50 about its pivotal support does not change the position of lever 47.

The plate 54 provides a pair of upstanding arms 58 carrying a transverse pin 60 which forms a pivotal mounting for one end of a second lever 62. This lever 62 has a tongue portion 64 which is pressed out from the remainder of the lever and provides an arcuate surface engaging one end of the lever 47 as shown most clearly in Figure 2. A light spring 66 is attached to plate 54 as indicated at 68 and overlies lever 62 in such a manner as to hold this lever in engagement with the lever 47, the spring 66 having its free end provided with fingers 70 which prevent displacement of the spring from its engagement with the lever 62.

The two levers 47 and 62 are both levers of the third class, that is, the power is applied to the lever between the fulcrum and the weight.

It will be noted that the tongue portion 64 of the lever 62 engages the rib on the lever 47. Since this rib is arcuate in cross section, it is not essential that the pivot pin 60 be parallel to the axis of the journals 46. This feature reduces the cost of manufacture and facilitates the assembly operation.

The free end of the lever 62 carries a resilient contact finger 72 which slidably engages the resistance element 74 formed by winding a resistance wire into a plurality of coils about an insulating support 76 which is slightly arcuate in a vertical plane as indicated more clearly in Figure 2. A rivet 78 attaches the insulating strip 76 to an upstanding portion 80 of the plate 54 and a second insulating strip 82 is interposed between the portion 80 and the wire of the resistance element 74 to prevent electrical communication between the resistance element 74 and the plate 54. An insulating washer 84 is provided to insulate the rivet 78 from the upstanding portion 80 of the plate 54. The upper end of the wire of the resistance element 74 is in electrical communication with a finger 86 contacting with the head of an electrical terminal 88 which passes through the upper end of an enclosing housing 90. Insulating washers 92 prevent electrical communication between the terminal 88 and the housing 90 and also provide a fluid tight seal between the terminal 88 and housing 90. A nut 94 and metallic washer 96 clamp the terminal 88 and washers 92 to the end of the housing 90 and a second nut 98 serves to attach a conductor 100 to the terminal 88. It will be understood that the conductor 100 is connected to any suitable indicator as by means of a wire 102 (Figure 1). The contact finger 72 is grounded to the automobile frame through its supporting parts.

The parts in Figure 2 are shown in the positions which they assume when the diaphragm 22 is not being urged upwardly. The rest or zero position of the contact finger 72 with respect to the resistance element 74 may be adjusted by turning the stud 48 until the indicator which is connected with my improved sending unit has its pointer on the zero marking when no force is exerted on the diaphragm 22. Having thus adjusted the zero position of the indicator, the set screw 48 and its supporting arm 50 may be swung either in or out to shift the fulcrum point of the lever 46 and thereby obtain the desired reading of the instrument when the temperature or pressure condition to be measured is at a maximum. After the instrument has been adjusted to give the desired reading for both minimum and maximum conditions, the instrument will ordinarily retain this desired calibration throughout its life, since the parts are so designed and inter-related that they are practically free from wear and are not affected by such vibration as may be encountered upon an automotive vehicle or similar machine.

When fluid pressure is exerted upon the underside of the diaphragm 22, either by a fluid whose pressure is to be directly measured, or by an entrapped fluid whose pressure is proportional to the temperature to be indicated, the annular corrugations of the diaphragm 22 permit the central portion of this diaphragm to move upwardly an amount proportional to the pressure of the liquid beneath the diaphragm. This moves upwardly the central portion of lever 47 and causes it to pivot around its fulcrum 48, whereupon the left-hand end of the lever 47, as viewed in Figure 2, moves the tongue 64 of lever 62 upwardly and causes this second lever to swing about its pivotal support 60. The free or right-hand end of the lever 62 carries the contact finger 72 and moves it upwardly on the resistance element 74 an amount proportional to the pressure increase in the diaphragm chamber 20.

In the drawings, the resistance element 74 is indicated as having a uniform resistance for each increment of its length and under these conditions, the amount of resistance cut out by the upward movement of the contact 72 is directly proportional to the upward movement of this contact. It is of course well known to provide resistance elements whose resistance varies for different increments of length of the resistance element, and for special purposes I may provide my improved sending unit with a resistance element of this type.

As the pressure in the diaphragm chamber 20 decreases, the central portion of the diaphragm 22 drops, due to the inherent resiliency of the diaphragm itself. Levers 47 and 62 and contact fingers 72 follow the downward movement of the diaphragm, both because of the weight of these parts and because of the force exerted by the return spring 66. It is to be understood that while the contact finger 72 accurately follows the movement of the diaphragm 22, the levers 47 and 62 act as movement multiplying means so that the total movement of the contact finger 72 is greater than the total movement of the central portion of the diaphragm 22.

The operating parts are amply protected against injury by the housing 90. This housing also excludes dust, dirt and water. Because the operating parts of my improved sending unit are enclosed in a water tight housing, the entire sending unit may be submerged in liquid if desired.

From the foregoing description of an embodiment of my invention, it will be understood that my new and improved sending unit for indicators may be made of simple and inexpensive parts, most of which may be stampings, and that the various parts of the sending unit may be easily assembled and calibrated. Furthermore, the assembled unit is sturdy and durable and is capable of continued and efficient use over a long period of time, even where subjected to severe vibration such as is encountered on automotive vehicles.

It is to be understood that my invention is not limited to the details shown in the drawings, but may assume various forms and that the scope of my invention is to be limited solely by the following claims.

I claim:

1. In combination, an element movable in response to variations in a characteristic, a first lever supported intermediate its ends upon said element, an adjustable fulcrum engageable by one end of said lever, a second lever, a pivotal mounting for one end of said second lever located in proximity to the other end of said first lever, said second lever having an intermediate portion engaging the upper surface of the first lever at its said other end, means biasing the second lever toward the first for maintaining the intermediate portion thereof in engagement with said other end of the first lever and said one end of the first lever in engagement with its fulcrum, and means operable by the said second lever.

2. In combination, an element movable in response to variations in a characteristic, a first lever of the third class actuated by said element, said lever having contact engagement with a fulcrum, a second lever of the third class pivotally mounted adjacent one end of the first lever for movement above, and having contact engagement with, the first lever, means biasing the second lever toward the first whereby it is maintained in engagement with the first lever and the latter is maintained in engagement with its fulcrum, and means operated by the second lever.

3. In combination, an element movable in response to variations in a characteristic, a first lever supported intermediate its ends upon said element, an adjustable fulcrum engageable by one end of said lever, a second lever, a pivotal mounting for one end of said second lever located in proximity to the other end of said first lever, said second lever having an intermediate portion engaging the upper surface of the first lever at its said other end, and means biasing the second lever toward the first for maintaining the intermediate portion thereof in engagement with said other end of the first lever and said one end of the first lever in engagement with its fulcrum, said fulcrum being adjustable longitudinally of the lever, and means operated by the second lever.

4. In combination, an element movable in response to variations in a characteristic, a first lever supported intermediate its ends upon said element, an adjustable fulcrum engageable by one end of said lever, a second lever, a pivotal mounting for one end of said second lever located in proximity to the other end of said first lever, said second lever having an intermediate portion engaging the upper surface of the first lever at its said other end, means biasing the second lever toward the first for maintaining the intermediate portion thereof in engagement with said other end of the first lever and said one end of the first lever in engagement with its fulcrum, and means operated by the second lever, said adjustable fulcrum comprising a support movable longitudinally of the first lever and a fulcrum defining member mounted on said support for movement in a direction substantially perpendicular to the first lever.

5. In combination, an element movable in response to variations of a characteristic, a lever supported intermediate its ends by said element, one end of said lever having a substantially flat surface, a second lever, a supporting plate substantially parallel to the first lever when the latter is in its normal position, said second lever being pivotally mounted beyond the other end of said first-mentioned lever upon said supporting plate and having a dependent intermediate portion engaging said other end of the first-mentioned lever, means operated by the other end of said second lever, a fulcrum for the first-mentioned lever in engagement with the flat surface portion thereof, said fulcrum comprising a set screw rotatably adjustable in a direction substantially perpendicular to said flat surface, and a support for said screw mounted upon said plate for pivotal movement substantially parallel to and longitudinally of said flat surface when said first lever is in its normal position, whereby the minimum position adjustment of said second lever may be effected by rotating said set screw and maximum position adjustment may be effected by moving said support.

6. In combination, a lever movable in response to variations in a characteristic having a flat upper surface, a fulcrum engaging said surface, supporting means for said fulcrum pivotally movable substantially parallel to and longitudinally of said surface, a second surface provided by said lever at an angle to the said mentioned surface, a second lever engaging said second surface, and a rheostat operated by said second lever.

7. In a sending unit of the class described, the combination of means including a pressure actuated diaphragm, a centrally apertured movement restricting cover therefor, a lever supported intermediate its ends by means extending through the aperture and operatively connected to the diaphragm, one end of said lever having a substantially flat upper surface, a second lever, a supporting plate secured to and located above the cover, said second lever being pivotally mounted beyond the other end of said first-mentioned lever upon said supporting plate and having a dependent intermediate portion engaging said other end of the first-mentioned lever, a spring biasing the second lever toward the first, a movable contact carried by the other end of said second lever, an arcuate resistance facing said contact and engageable thereby supported by said plate substantially centrally of the diaphragm, said resistance having a terminal near its upper end, a fulcrum for the first-mentioned lever in engagement with the flat surface portion thereof, said fulcrum comprising a set screw rotatably adjustable substantially perpendicular to said flat surface, a support for said screw mounted upon said plate for pivotal movement parallel to and longitudinally of said flat surface when said diaphragm is in undeflected position, whereby the minimum position adjustment of said contact may be effected by rotating said set screw and maximum position adjustment may be effected by pivotally moving said support, and a substantial conical housing for said diaphragm, cover, and resistance having an insulated terminal at its upper end connected to the upper terminal of the resistance.

8. In a sending unit of the class described, the combination of means including a pressure actuated diaphragm, a centrally apertured movement restricting cover therefor, a lever supported intermediate its ends by means extending through the aperture and operatively connected to the diaphragm, one end of said lever having a substantially flat upper surface, a second lever, a supporting plate secured to and located above the cover, said second lever being pivotally mounted beyond the other end of said first-mentioned lever upon said supporting plate and having a dependent central portion engaging said other end of the first-mentioned lever, a spring biasing the second lever toward the first, a movable contact carried by the other end of said second lever, an arcuate resistance facing said contact and engageable thereby supported by said plate, a fulcrum for the first-mentioned lever in engagement with the flat surface portion thereof, said fulcrum comprising a set screw rotatably adjustable substantially perpendicular to the flat surface, and a support for said screw mounted upon said plate for pivotal movement parallel to and longitudinally of said flat surface when said diaphragm is in undeflected position.

9. In a sending unit of the class described, the combination of means including an element movable in response to variations in a characteristic being measured, an apertured movement restricting cover for said element, a lever supported intermediate its ends by means extending through the aperture and operatively connected to the element, one end of said lever having a substantially flat upper surface, a second lever pivotally mounted beyond the other end of said first-mentioned lever and having an intermediate portion in operative engagement with the other end of said first-mentioned lever, a spring biasing the second lever toward the first, a movable contact carried by the other end of said second lever, an arcuate resistance engageable thereby, and a fulcrum for the first-mentioned lever in engagement with the flat surface portion thereof, said fulcrum being adjustable in directions substantially perpendicular to and longitudinally of the flat surface.

10. In a sending unit of the class described, the combination of a metal diaphragm, a substantially dish-shaped plate co-operating with said plate to provide a diaphragm chamber, said plate having a peripheral flange and said diaphragm having a flange encircling said peripheral flange, means for admitting fluid to said chamber, an apertured cover for said diaphragm limiting movement thereof, said cover having a turned-over edge for securing together said cover, diaphragm, and plate, electrical control means supported directly above said cover by said cover and diaphragm and actuated by the diaphragm, said control means including a terminal member, a housing enclosing said control means having a turned-over edge partially surrounding the turned-over edge of the cover, and an electrical terminal connected to said terminal member and supported by and insulated from the housing.

HOMER F. MALONE.